April 30, 1957  D. S. MILLER  2,790,950
DETERMINING THE PERMEABILITY OF MAGNETIC MATERIAL
Filed Feb. 24, 1954
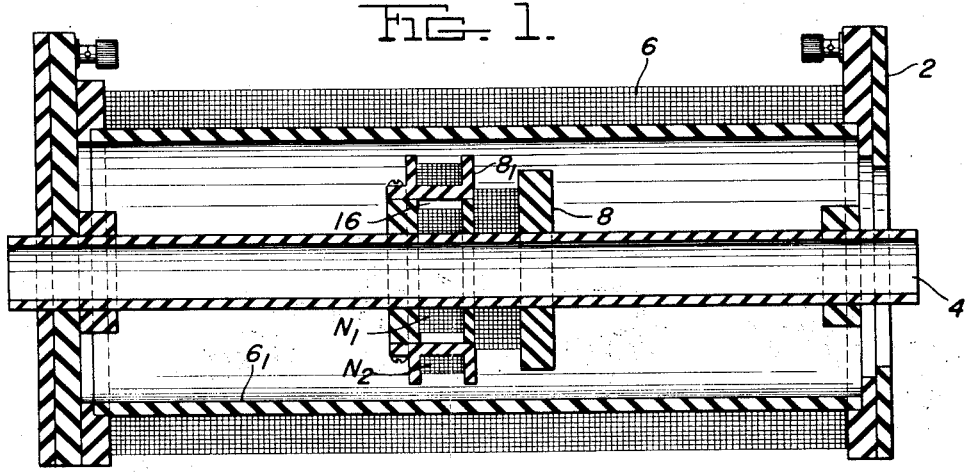
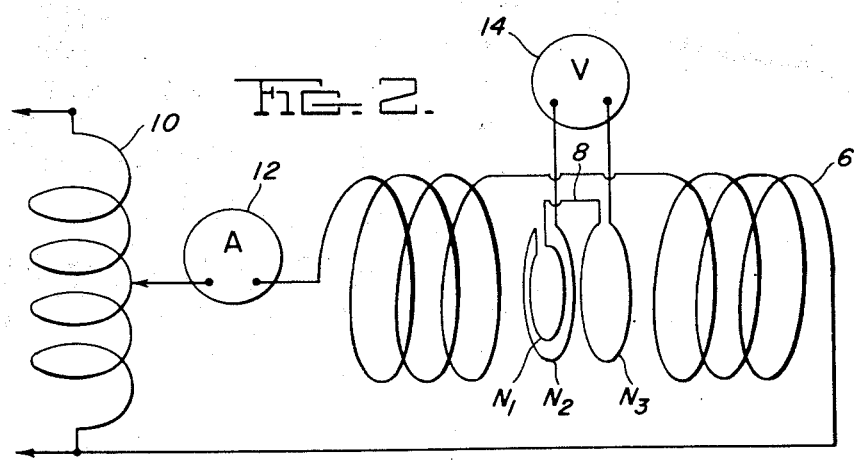
INVENTOR:
DONALD S. MILLER,
BY: Donald G. Dalton
his Attorney.

United States Patent Office 2,790,950
Patented Apr. 30, 1957

2,790,950

DETERMINING THE PERMEABILITY OF MAGNETIC MATERIAL

Donald S. Miller, Westfield, N. J., assignor to United States Steel Corporation, a corporation of New Jersey Application February 24, 1954, Serial No. 412,245

3 Claims. (Cl. 324—34)

This invention relates to the measuring of magnetic permeability of weakly magnetic material and more particularly to the measuring of magnetic permeability of substantially nonmagnetic wire cable and the like.

Wire cables for certain uses must be so nearly austenitic that direct determination of the ferrite content by conventional metallographic means does not afford a practical control. While certain apparatus has been devised for measuring permeability by magnetic balance, specimens of certain size and weight are required. In addition, the cutting and preparation of such specimens requires painstaking control so that no austenite is transformed thereby. In the case of preparaing specimens of cable, the difficulties are so great that as a practical matter such method is of no value.

It is accordingly an object of the present invention to provide a method and apparatus for determining magnetic permeability of wire and cable which does not require elaborate specimen preparation.

It is a further object of the present invention to provide apparatus for determining magnetic permeability which is simple in design.

The foregoing and further objects will be apparent from the following specification when read in conjunction with the attached drawing, wherein:

Figure 1 is a longitudinal cross-sectional view of the improved coil of my invention; and Figure 2 is a schematic wiring diagram thereof.

Referring more particularly to the drawing, the numeral 2 designates the improved coil of my invention having a centrally disposed tube 4 extending therethrough into which the wire or cable to be tested is inserted. The tube 4 is composed of dielectric material such as "Bakelite." The coil comprises a primary coil 6 and a secondary coil 8. The primary coil 6 is wound on a dielectric spool $6_1$ and is connected to a source of alternating current through a variable transformer 10 and an ammeter 12 of the type which measures the peak or maximum current flowing in the primary coil 6.

The secondary coil 8 includes in its circuit a volt meter 14 preferably of the vacuum-tube type. The secondary comprises a pair of concentrically disposed coils $N_1$, $N_2$ of equal turns wound on dielectric spool $8_1$ and tube 4, and connected in opposition so that the net voltage output is therefore proportional to magnetic flux to annular space between. In addition to coils $N_1$ and $N_2$, the secondary comprises a coil $N_3$ connected in series opposition thereto, disposed adjacent thereto and having an inner diameter substantially the same as $N_1$. Coil $N_3$ is wound to have an output equal to that of $N_1$ and $N_2$ so that the air flux is completely balanced, i. e. the inducted voltage across the secondary 8 is approximately zero when no specimen, i. e. metallic core, is in the tube 4. In other words the construction and interconnection of coils $N_1$, $N_2$ and $N_3$ is such that $$E_s = E_3 - (E_2 - E_1) = 0$$

when there is no specimen in tube 4, where $E_s$=voltage of secondary
$E_3$=voltage of $N_3$
$E_2$=voltage of $N_2$
$E_1$=voltage of $N_1$ When a specimen to be tested for magnetic permeability is placed in tube 4 so as to extend therethrough, it disturbs the magnetic flux distribution and upsets the electrical balance between the coils $N_1$, $N_2$ and $N_3$ resulting in a voltage output by the secondary. The value of this voltage $E_s$ is proportional to the excess of magnetic flux in the specimen over the air flux, i. e., is proportional to $B-H$, the ferric induction where $B$=the magnetic induction, and $H$=the magnetic field.

Expressed mathematically:

(1) $$B-H = K_s E_s / A_s$$

where
$K_s$=a constant determined by the number of turns in $N_3$;
$E_s$=the average value of the output voltage of the secondary; and $A_s$=the cross sectional area of the specimen.

The value of the magnetizing field H is expressed by (2) $$H = K_p I_p$$

where $K_p$=a constant determined by the dimensions and number of turns of the primary winding; and $I_p$=the maximum or peak value of current in the primary.

Dividing Equations 1 and 2 gives:

(3) $$B/H - 1 = \frac{K_s}{K_p} \frac{E_s}{A_s I_p}$$

Since $B/H$ is by definition, the magnetic permeability, U, Equation 3 can be written:

(4) $$U = 1 + K \frac{E_s}{A_s I_p}$$

where $$K = \frac{K_s}{K_p}$$

i. e., a constant determined by the physical dimensions of the foregoing given test coil constructed in accordance with the principles of my invention. The value, K, is readily determined and the permeability of the specimen is easily calculated by substituting the observed voltage and current readings and the cross sectional area of the specimen tested in the foregoing Equation 4. Charts or graphs can also be developed from which the permeability can be read directly.

In one embodiment of my invention, I construct the primary coil 6 by winding 1323 turns of #14 enamel and cotton covered wire on the "Bakelite" spool $6_1$ which is approximately 12" long and has an O. D. of 3¼". The outside diameter of the coil 6 is about 4¼". I next construct coils $N_1$ and $N_2$ of the secondary which are wound on tube 4 and spool $8_1$ respectively. Each of the coils $N_1$ and $N_2$ comprise 1944 turns of #36 enamel and silk covered wire. Coil $N_1$ has an I. D. of 1" and an O. D. of 1½". Coil $N_2$ has an I. D. of 2" and an O. D. of 2½".

The coils are spaced ½" apart. Coil $N_3$ is wound on the tube 4 adjacent $N_1$ and $N_2$ and contains 3417 turns. In actual construction, it is best to wind coil $N_3$ in excess of the calculated number of turns and adjust to the proper number of turns by the removal of turns until the secondary voltage is zero when the primary is excited and no specimen is in position in the test coil. Since the ordinarily available ammeters are calibrated to read root-mean-square values, to obtain peak value of current in the secondary, the meter readings must be multiplied by the square root of two. Similarly since the volt meters are commonly calibrated to read root-mean-square value, the true average value of voltage output of the secondary for use in Equation 4 is obtained by dividing such meter reading by 1.11. For a test coil of the foregoing dimensions used in conjuction with meters calibrated in a conventional manner, the Equation 4 can be reduced to the following form:

$$(5) \qquad U = 1 + \frac{1.493\, E_{rms}}{A_s \times I_{rms}}$$

Since the units of the above equation are in the C. G. S. system, the value of cross-sectional area of the specimen, $A_s$, must be in these units. In use the foregoing coil of the specimen should be of sufficient length to extend through the receiving tube 4. The accuracy of the test coil is illustrated in Table I below in which the magnetic permeability of a number of specimens have been determined by the conventional magnetic balance and by the test coil of the present invention. It is apparent that the two methods are of comparable accuracy, the present method having the great advantage that the tedious preparation of the specimen required for the magnetic balance method is avoided and the results are obtained much more quickly.

*Table I*

| Specimen Description | Magnetic Permeability | |
|---|---|---|
| | By Test Coil [1] | Magnetic Balance [2] |
| ⅝ | 1.012 | 1.010 |
| ⁵⁄₃₂—7 x 9 | 1.015 | 1.011 |
| ⅛—7 x 19 | 1.033 | 1.029 |
| ³⁄₁₆—7 x 7 | 1.009 | 1.007 |
| ⅛—7 x 19 | 1.023 | 1.019 |
| ³⁄₁₆—7 x 19 | 1.050 | 1.015 |

[1] All specimens for coil test were at least 12″ long.
[2] Specimens for magnetic balance about ½″ long, 0.25 to 2 grams weight.

While I have shown and described one specific embodiment of my invention, it will be understood that this embodiment is merely for the purpose of illustration and description and that various other forms may be devised within the scope of my invention, as defined in the appended claims.

I claim:

1. A coil for measuring magnetic permeability of weakly magnetic material comprising an elongated hollow primary, a secondary disposed interiorly and centrally of said primary, said secondary consisting a pair of concentrically mounted coils connected in series opposition and having the same number of turns, said concentric coils having an annular air gap therebetween, and a third coil connected in series opposition to said concentric coils.

2. Apparatus for measuring magnetic permeability of weakly magnetic wire cable comprising an elongated hollow primary connected to a source of alternating current and an ammeter in series therewith, a secondary disposed on a specimen receiving tube interiorly and centrally of said primary, said secondary comprising a pair of concentrically mounted coils connected in series opposition and having the same number of turns, said concentric coils having an annular air gap therebetween, and a third coil connected in series opposition to said concentric coils and a voltmeter connected across said secondary.

3. Apparatus for measuring magnetic permeability of weakly magnetic elongated material comprising an elongated primary connected to a source of alternating current, a secondary disposed around a specimen receiving tube interiorly and centrally of said primary, said secondary consisting of a pair of concentrically mounted coils having the same number of turns connected in series so that current flowing therethrough will traverse the two coils in opposite senses, and a third coil disposed adjacent said concentric pair of coils connected in series opposition thereto so that current flow therethrough is counter to that in the outer coil of said pair, said third coil having sufficient turns to provide a voltage output therefrom equal to that of said concentric pair when no specimen is in said specimen receiving tube whereby the output voltage of said secondary is proportional to the excess of magnetic flux density in a specimen in said specimen receiving tube over that in air at same point when no specimen is therein.

References Cited in the file of this patent
UNITED STATES PATENTS
2,574,311    Zuschlag _____ Nov. 6, 1951